United States Patent [19]

Ahn

[11] Patent Number: 4,980,554
[45] Date of Patent: Dec. 25, 1990

[54] LASER LINE IDENTIFIER

[75] Inventor: Byong H. Ahn, Springfield, Va.

[73] Assignee: The United States of America as represented by the Secretary of the Army, Washington, D.C.

[21] Appl. No.: 331,195

[22] Filed: Mar. 31, 1989

[51] Int. Cl.$^5$ .............................................. G01J 3/28
[52] U.S. Cl. .................................... 250/394; 250/339
[58] Field of Search ...................... 250/394, 339, 330; 372/29, 32

[56] References Cited

U.S. PATENT DOCUMENTS 4,450,565  5/1984  Copeland .............................. 372/32
4,751,571  6/1988  Lillquist ............................... 250/330

FOREIGN PATENT DOCUMENTS 0156181 10/1985 European Pat. Off. ............ 250/330

Primary Examiner—Jack I. Berman
Assistant Examiner—Richard Honig
Attorney, Agent, or Firm—Milton W. Lee; John E. Holford; Anthony T. Lane

[57] ABSTRACT

The Laser Line Identifier (LLI) is a real-time device which can indicate the wavelengths of the laser radiations. LLI mainly consists of a beam splitter, narrow bandwidth transmission filters and detectors. The filters and the detectors form a unique pair so that a signal detected at a particular detector can only mean the radiation of a certain wavelength. The detectors are hardwired to a set of indicators such as a set of colored lights or a voice recording so that the wavelength of the radiation is clearly indicated even to a non-technical person.

7 Claims, 2 Drawing Sheets

LASER LINE IDENTIFIER

The invention described herein may be manufactured, used, and licensed by the U.S. Government for governmental purposes without the payment of any royalties thereon.

BACKGROUND OF INVENTION

1. Field

The invention relates to radiation detectors particularly the types which can separate very narrow band line spectra so as to identify types and wavelengths of laser sources.

2. Prior Art

Numerous devices have been devised to study the line spectra of radiant sources such as the sun and more recently lasers. The usual arrangement includes a diffraction grating or prism in the radiation path and some type of detector which scans the resulting separated spectral lines. Effective gratings are very expensive and the detection system must be very precise to detect the small separations achieved. A number of lasers are now being developed for use on the battlefield both as surveillance devices and offensive weapons per se. These weapons are mainly intended to blind foot soldiers and vehicle operators. They also present a special threat to equipment having optical systems that intensify light with convergent focussing and systems having sensitive detectors like the Army's Forward Looking Infrared Viewer (FLIR). Since these weapons operate only in very narrow frequency bands, it is possible that their radiation may be rejected by suitable filters without the need to blindfold equipment operators or shut down needed equipment. The array of lasers has become too vast to permit proper protection from all of them, but in most real world situations only one or at most a few different lasers need be dealt with. The solution to this problem requires a knowledge of which frequencies are involved at a specific locale. This, in turn, requires an inexpensive, rugged, portable and highly accurate spectrometer. An object of the present invention is to provide such a spectrometer.

SUMMARY OF THE INVENTION

The invention provides a spectrometer consisting of a large plurality of extremely narrow band filters each with its own detector and display and/or warning device. Each filter represents a characteristic line frequency of a different type of laser that may be present at the test locale in which the spectrometer is placed.

BRIEF DESCRIPTION OF DRAWINGS

The invention is best understood with reference to the accompanying drawings, wherein.

DESCRIPTION OF THE PREFERRED EMBODIMENT

Figure 1:
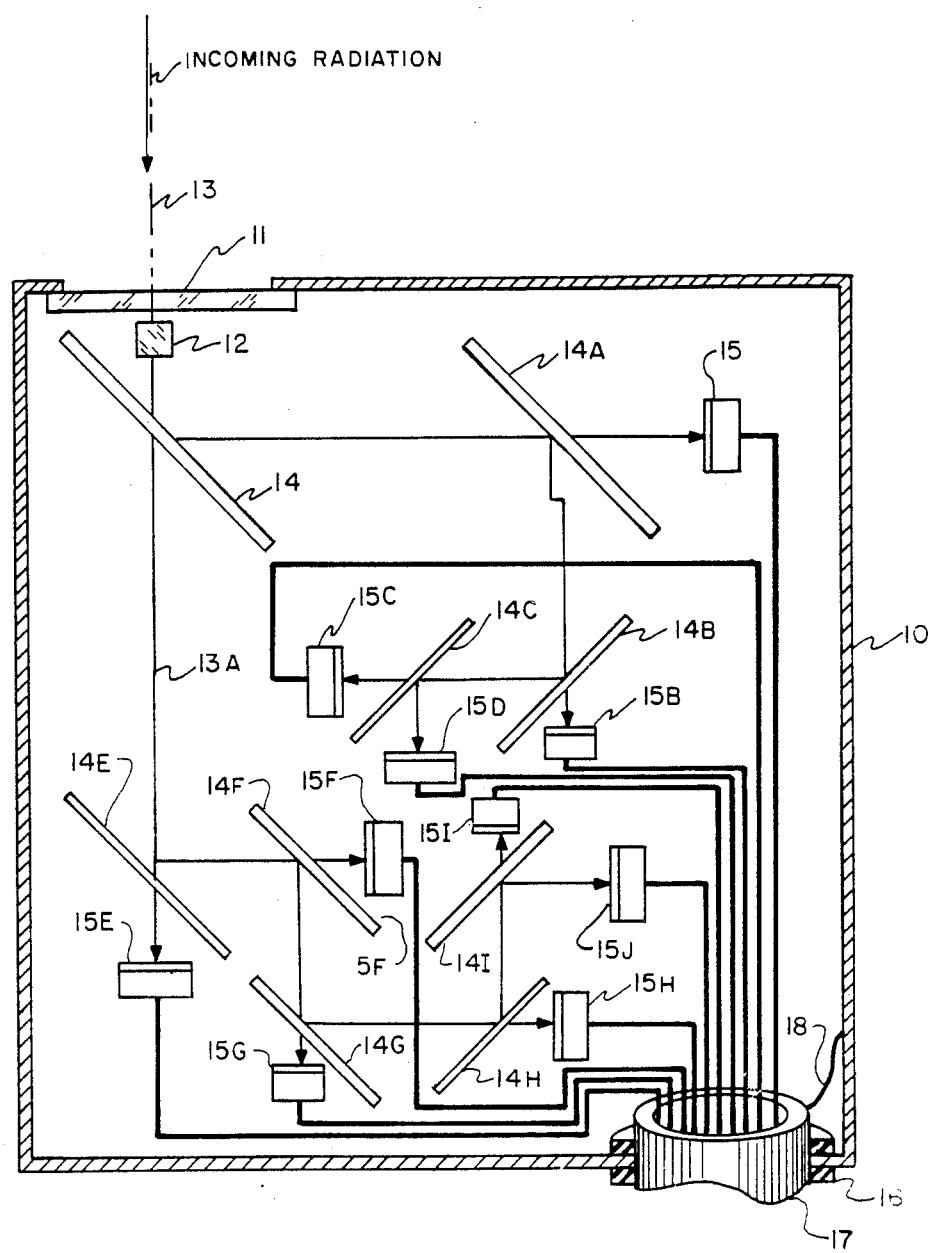
FIG. 1 shows a line filter-detector module, according to the present invention.

As shown in FIG. 1 the line filter-detector module is enclosed in a case 10. This case may enclose only the elements shown or may be expanded, if necessary, to include any or all of the components in the display-warning module of FIG. 2, as will become evident. An aperture is provided in the front of this case which is sealed with a window wafer 11. The material of the window is chosen to provide low attenuation of laser beams operating in the ultraviolet to the far infrared region. These materials include various special glasses, quartzes sapphires, IRTRAN, germanium, barium fluoride and numerous other crystalline and amorphous materials. The window, which may be considered to be a broadband filter, can be a composite structure, if desired, uniform in the thickness direction but varying normal thereto to admit different spectral bands of frequency over a continuous broad frequency pass-band.

The incoming radiation 13 from local lasers passes through window 11 and is focussed into a tightly collimated narrow beam by collimator 12. The material of collimator 12 is chosen from the same group of materials as window 11. In fact, window 11 may comprise one lens of the collimator, making it possible to have a readily detachable collimator structure mounted through the case aperture. For convenience the beam is split with a sapphire wafer 14 into a primary beam of far-infrared components (8-12 micrometer wavelengths) and a secondary beam of near visible components (400-4000 nanometers), the former readily reflecting off the surface with little attenuation. The far infrared beam portion 13B is next reflected off a series of filters 14A-14C etc. each of which consists of a stack of quarter-wave plates or an equivalent low-loss rugate structure tuned to a selected line frequency prominently produced by a particular type of laser. Examples are ruby lasers, YAG lasers, $CO_2$ lasers, etc. The selected line frequencies thus pass through the filters to corresponding detectors 15A-15C etc. In general, the number of filters is equivalent to the number of possible lasers. If a laser can only be identified by the presence of two or more lines, the filters and detectors for these lines must be provided, as well as an AND gate to combine the line detectors for such a laser. The remaining radiation is absorbed by a wide band terminal detector element 15D capable of detecting any remaining frequency component. The near visible beam 13A similarly reflects betweens filters 14E-14I, etc. tuned to near visible line components and thus activates appropriate detectors 15E-15I, etc. with a similar wide band terminal detector element 15S. When the display elements (to be described at FIG. 2) are not mounted in the housing or case 10, a convenient means of extracting the diode response signals is to place a grommet or strain relief member 16 in an output aperture on the case and bring in a multiconductor cable 17 with a sampling conductor for each diode and the usual common return conductor 18, frequently a metal sheath coupled to all diodes through the metal case.

Figure 2:
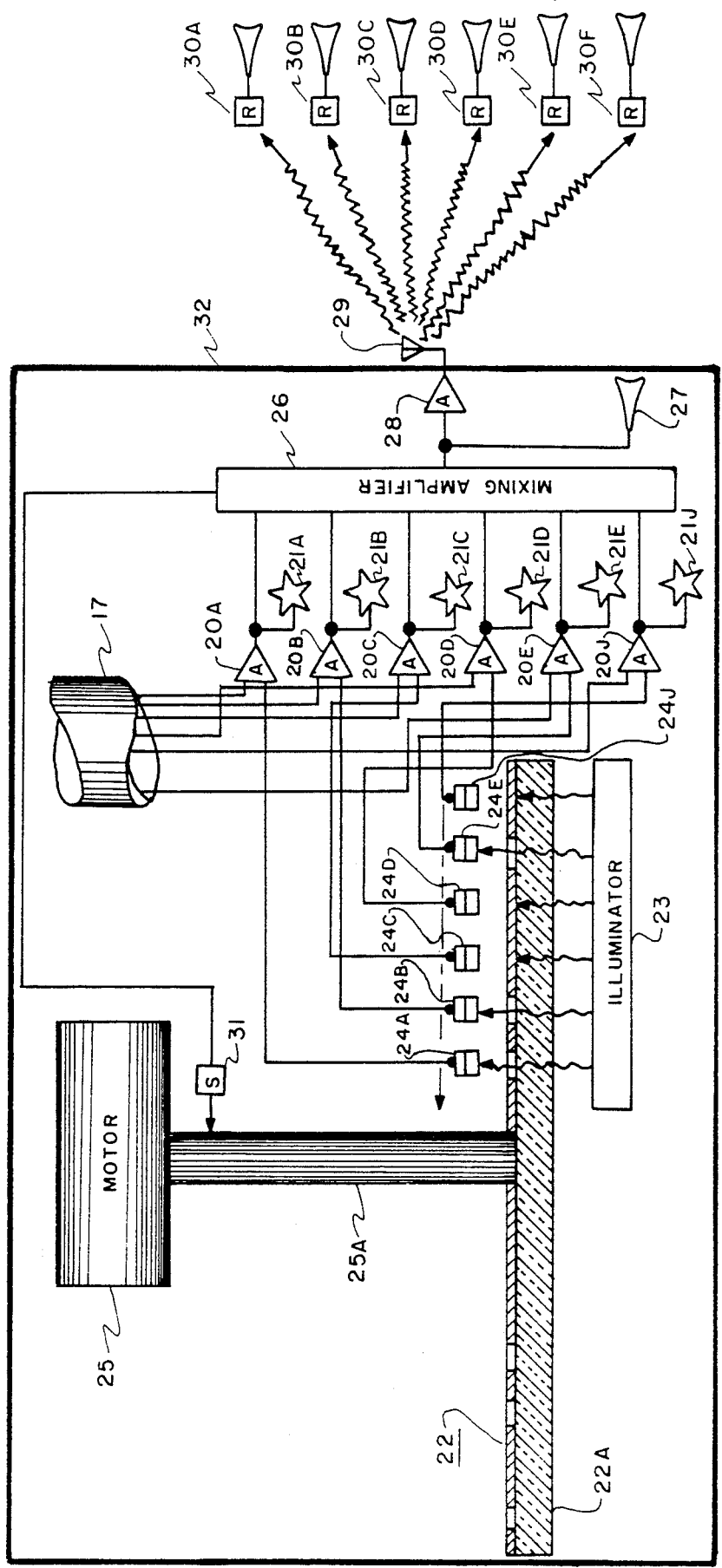
FIG. 2 shows a display-warning module, according to the invention, which utilizes the output from the FIG. 1 module.

As shown in FIG. 2 the remaining end of each coupling conductor is connected to one input of a corresponding one of operational amplifiers 20A-20J, only six of which are shown. A diode response triggers an amplifier lighting one of the indicator lamps or LED's 21A-21J. The lamps may be colored differently or have inscriptions to identify the laser detected. In addition, or instead of, this visual indication an aural response may be provided. A moving storage element, here portrayed as an optical disk 22 with a clear substrate 22A and opaque markings 22B on its surface, provides a series of messages or codes, one for each amplifier 20A-J. The disk is illuminated by light source 23 and pickup optical detector elements 24A-24J generate the messages as motor 25 revolves the disk. The pickup elements may move radially as indicated by the dashed arrow to follow spiral tracks on the disk. Similar arrangements using magnetic pickups and belt or drum storage devices will be obvious to those skilled in the art. The output of the pickup elements is coupled to a second input on a corresponding one of the amplifiers 20A-20J so that a code or verbal audio message is keyed out when the corresponding indicator device 21A-21J is activated. Each message enters one of the inputs to a mixing amplifier 26. The output of amplifier 26 may be used to drive a speaker 27 near the spectrometer or amplified by transmitter 28 and broadcast by antenna 29 to receivers 30A-30F. Earphones may be used in place of speakers. For security, antenna 29 may be directional or a modulated light beam may replace the antenna. A synchonizing switch 31 may be mounted near the motor shaft 25A to trigger the mixing amplifier on at the beginning of the messages, if desired. If not included in housing 10, the elements of FIG. 2 may be mounted in a separate housing 32.

I claim:

1. A laser line identifier comprising:
   a housing defining an aperture to admit laser radiation;
   focussing means mounted near said aperture to focus said laser radiation into a main beam of tightly collimated radiation;
   a plurality of extremely narrow pass band reflection type optical filters, each tuned to a different frequency component of said main beam and positioned to serially reflect said main beam to a terminal absorber;
   a detector located behind each of said filters in the path of radiation passed by said filter; and
   a primary alarm means coupled to each one of said detectors for generating a humanly perceptible signal, when said component strikes said one detector, and thereby identify the laser responsible for said component.

2. The identifier according to claim 1, further including:
   a beam splitter located near said focussing means in the path of said main beam to separate said beam into a first beam of far-infrared radiation and a second beam of near visible radiation including near infrared and ultraviolet, each beam including a portion of said filters and a separate terminal absorber.

3. The identifier according to claim 1, wherein:
   said terminal absorber is a wide-band detector to sense any remaining frequency components in said beam; and
   a secondary alarm means to aurally announce the presence of said beam is coupled to said wide band detector.

4. The identifier according to claim 1, wherein:
   said primary alarm means is a coded light source.

5. The identifier according to claim 3, wherein:
   said secondary alarm means is a coded sound source.

6. The identifier according to claim 1, wherein:
   said primary alarm means includes a means to play a prerecorded verbal sound message.

7. The identifier according to claim 1, wherein:
   said primary alarm means includes an electronic signal generator, means to broadcast said signal over a limited range and azimuth angle and remotely located means to convert said electronic signal to said humanly perceptible signal.

* * * * *